Patented July 15, 1952

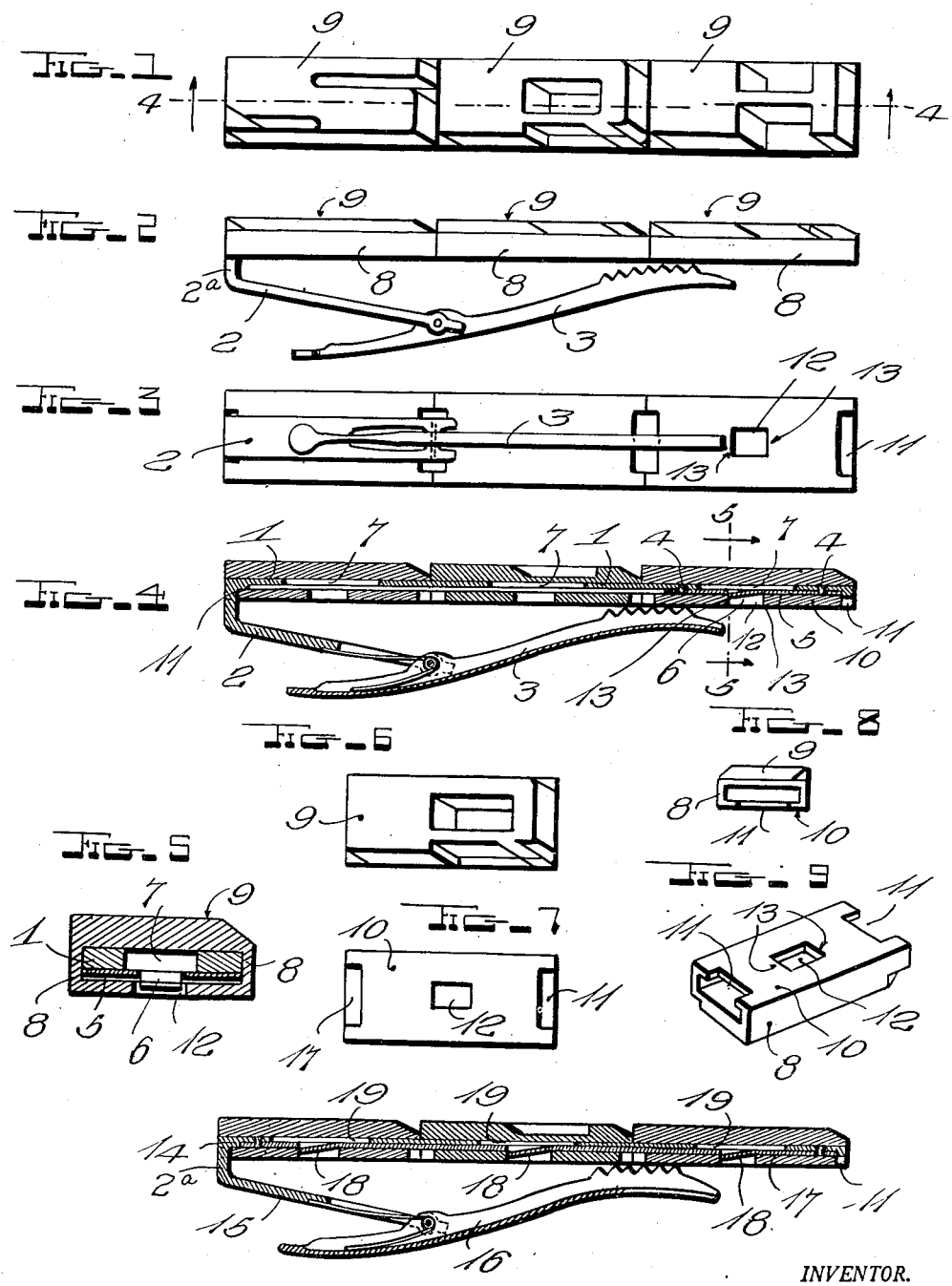

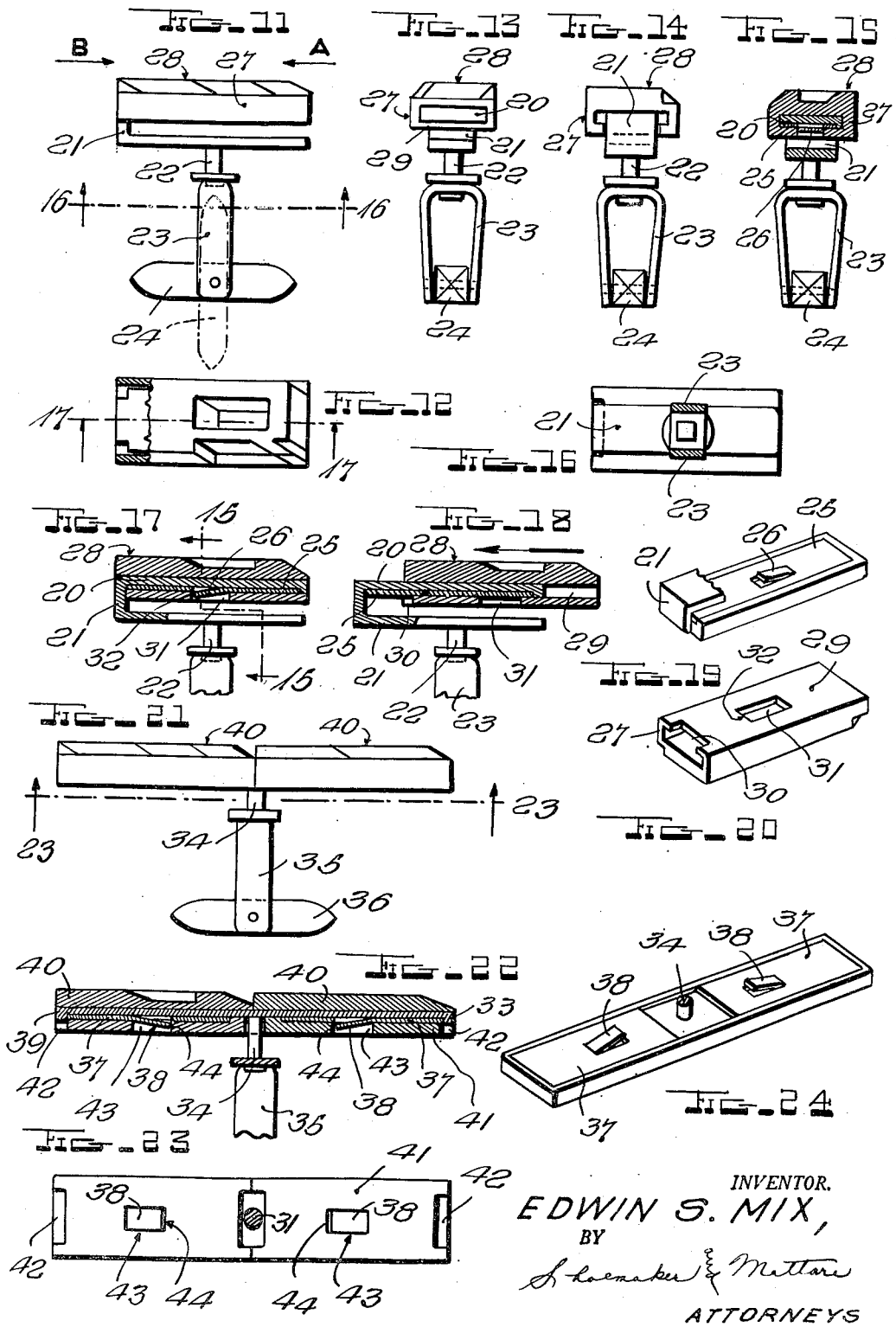

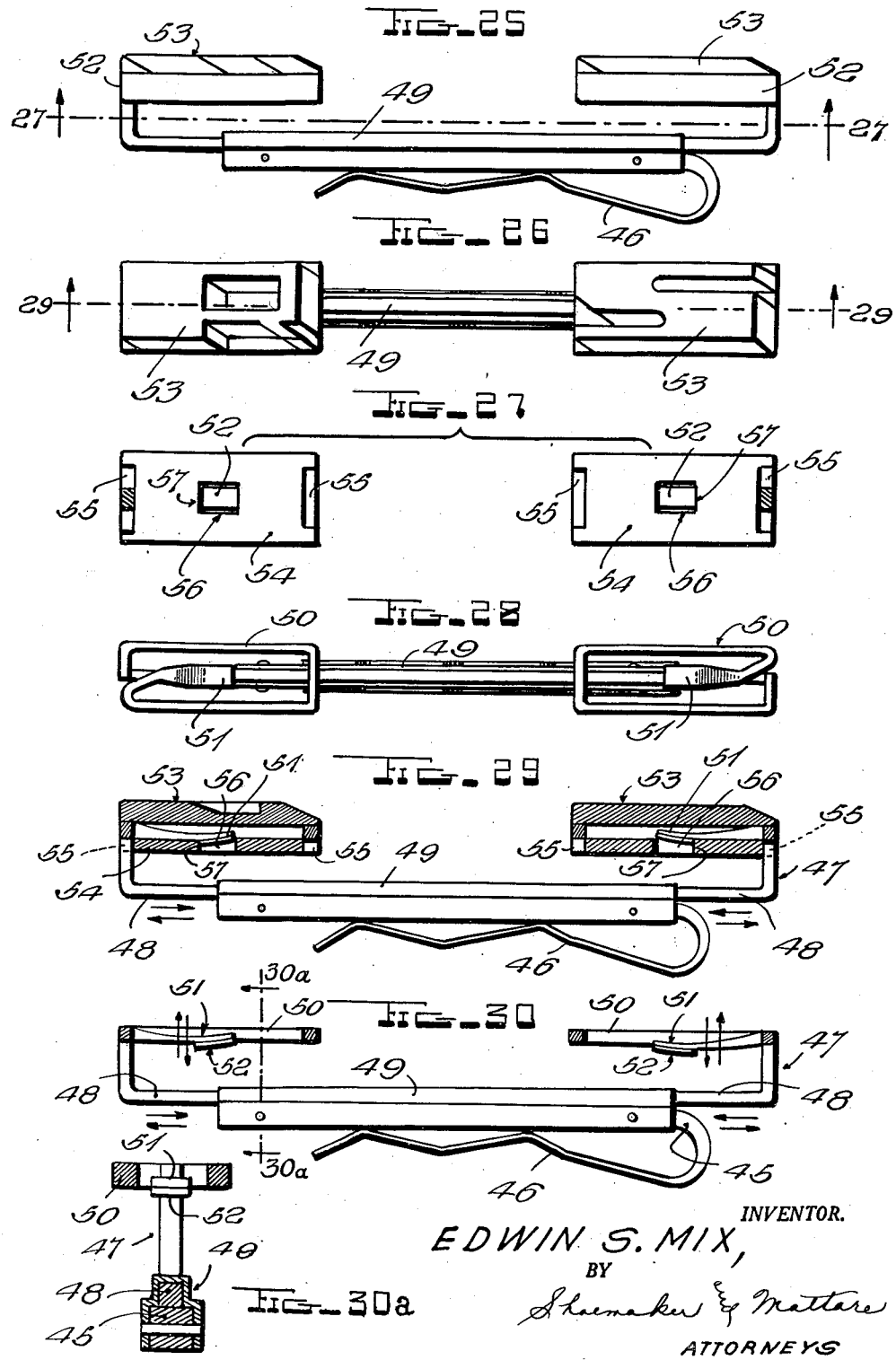

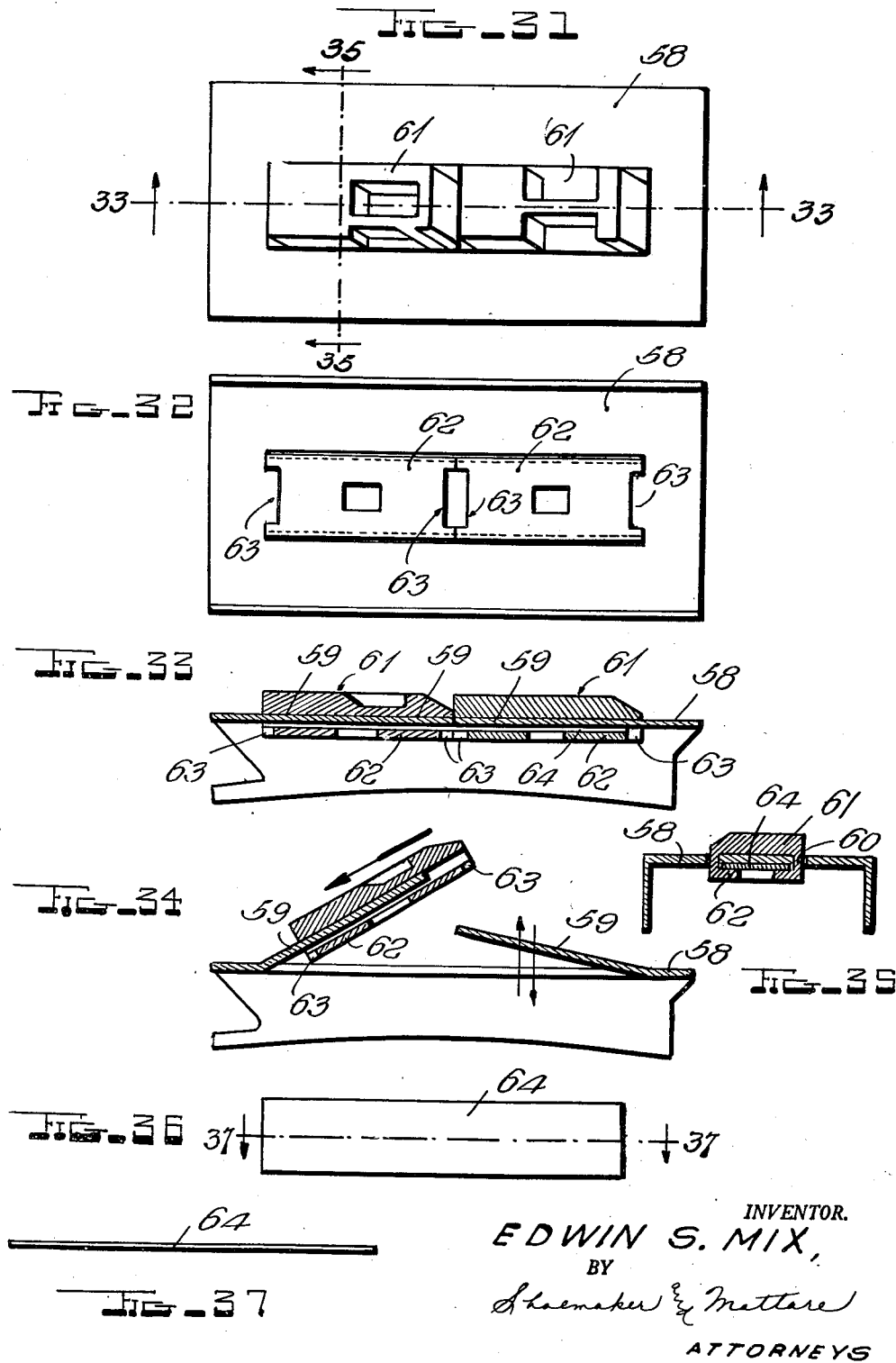

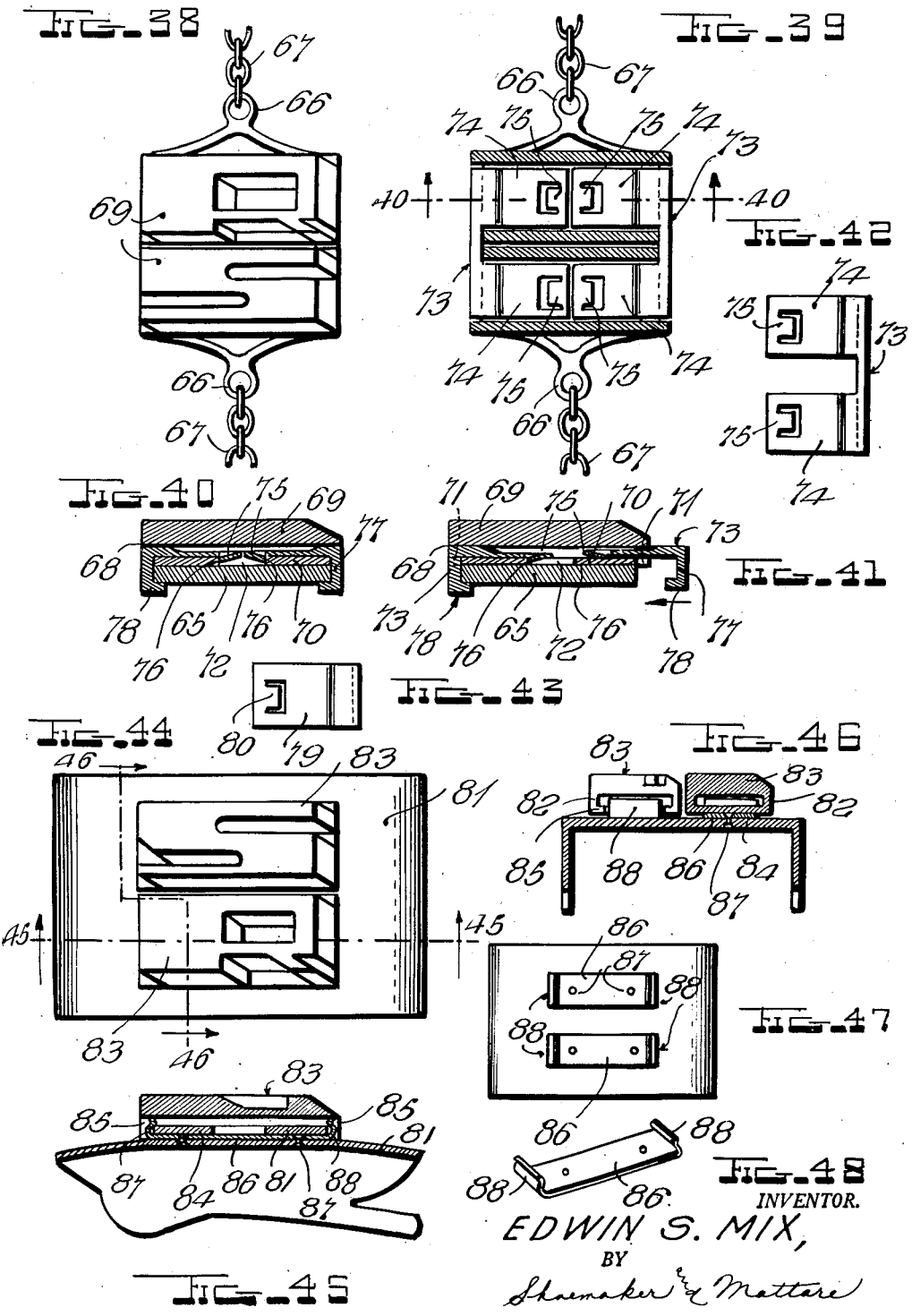

2,603,016

UNITED STATES PATENT OFFICE 2,603,016

MOUNTING FOR CHARACTER BEARING MEMBERS

Edwin S. Mix, Rochester, N. Y., assignor to Hickok Manufacturing Co. Inc., Rochester, N. Y., a corporation of New York Application October 9, 1947, Serial No. 778,917

8 Claims. (Cl. 40—140)

This invention relates to improvements in mountings for attaching character, legend or ornament bearing elements to various articles of merchandise including jewelry.

An object of the invention is to provide an improved mounting of simple construction that will enable the easy assembly of a character bearing element or a plurality of such elements on a supporting member or holder and securely hold the same thereon.

Another object of the invention is to provide an improved mounting for character bearing elements which when the character bearing elements are mounted on the support member or holder, the holding means will be completely concealed from view from the front thereof thereby materially enhancing the display of characters, initials or the like.

Another object of the invention is to provide an improved mounting enabling the ready assembling and locking of character bearing elements on a support member, and which will permit of easy removal of the same for rearrangement or the substitution of other character members.

Still another object of the invention is to provide an improved construction of character bearing member that can be used interchangeably with a support member of either bar or plate form and with different forms of locking means on the support member.

The improved mounting is adapted to be used with support members or holders of bar formation that have an attaching portion extending from the rear side at one end of the same, and a particularly important novel characteristic of the invention resides in the special construction of character bearing member in the form of a flat sleeve or tubular base portion with a recess in the back wall of the same at one end thereof which facilitates easy assembly of the character bearing members on the support member with one end of the back wall of its base portion fitting against the attaching portion of the holder bar and so that the holder bar is completely concealed from view from the front side of the character bearing member or members. In other instances where the rearwardly extending attaching portion on a support member of bar form is located intermediate the ends of the same, the particular construction of character bearing member with the recess in the back wall of the tubular base thereof, provides for easily slipping a character bearing member on the supporting bar from either end thereof with one end of the back wall of the base portion of each character member fitting against the rearwardly extending attaching portion and with the base portions thereof in close end to end relationship to completely conceal the supporting bar from the front of the assembled character bearing members.

Another important advantage of the particular construction of character member is that it can be used interchangeably with support members of either bar or plate form and with different forms of holding means employed respectively therewith.

Another important novel feature of the invention lies in the special means provided for locking the character bearing elements on the support member.

The invention, with other objects, advantages and novel features thereof, and the particular construction, combinations and arrangements of parts comprising the same will be understood from the hereinafter contained detailed description, when taken in connection with the accompanying drawings forming part hereof and illustrating a number of embodiments of the invention.

In the drawings:

Fig. 1 is a top plan view of a bar type tie holder having character bearing members mounted thereon in accordance with the present invention;

Fig. 2 is a side elevation of the same;

Fig. 3 is a bottom plan view;

Fig. 4 is a longitudinal section on the line 4—4 of Fig. 1;

Fig. 5 is a transverse section on the line 5—5 of Fig. 4;

Fig. 6 is a detail top plan view, on an enlarged scale, of one of the character bearing members;

Fig. 7 is a bottom plan view of the character bearing member shown in Fig. 6;

Fig. 8 is an end elevation, on a smaller scale, of one of the character bearing elements;

Fig. 9 is a rear perspective view of one of the character bearing members;

Fig. 10 is a longitudinal section of a slightly modified form of the locking means shown in Fig. 4;

Fig. 11 is a side elevation of a cuff link having a single initial bearing member attached thereto;

Fig. 12 is a top plan view of the construction shown in Fig. 11;

Fig. 13 is an elevation of one end of the construction shown in Fig. 11;

Fig. 14 is an elevation of the other end of the construction shown in Fig. 11;

Fig. 15 is a transverse section on the line 15—15 of Fig. 17;

Fig. 16 is a sectional view taken on the line 16—16 of Fig. 11;

Fig. 17 is a sectional view taken on the line 17—17 of Fig. 12;

Fig. 18 is a view similar to Fig. 17 but with the initial bearing member in an intermediate position on the holder bar;

Fig. 19 is a detail perspective view of the rear side of the support bar;

Fig. 20 is a detail perspective view of the initial bearing member taken from the rear side thereof;

Fig. 21 is a side elevation of a cuff link having two initial members attached thereto;

Fig. 22 is a central longitudinal sectional view of the construction shown in Fig. 21;

Fig. 23 is a section taken on the line 23—23 of Fig. 21;

Fig. 24 is a detail perspective view of the holder or retainer bar looking from the rear side thereof;

Fig. 25 is a side elevation of a tie holder of the extension type;

Fig. 26 is a top plan view of the construction shown in Fig. 25;

Fig. 27 is a sectional view on the line 27—27 of Fig. 25;

Fig. 28 is a top plan view of the construction shown in Fig. 25 without the initial bearing elements;

Fig. 29 is a sectional view taken on the line 29—29 of Fig. 26;

Fig. 30 is a view similar to Fig. 29 without the initial bearing members;

Fig. 30A is a transverse section on the line 30—30 of Fig. 30;

Fig. 31 is a top plan view of a buckle provided with initial bearing members in accordance with the present invention;

Fig. 32 is a bottom plan view of the construction shown in Fig. 31;

Fig. 33 is a section on the line 33—33 of Fig. 31;

Fig. 34 is a view similar to Fig. 33 but with the supporting tongues bent outwardly from the face of the buckle;

Fig. 35 is a transverse section on the line 35—35 of Fig. 31;

Fig. 36 and Fig. 37 are respectively a detail top plan view and side elevation of the locking strip;

Fig. 38 is a top plan view of an initial holder for key chains;

Fig. 39 is a top plan view of the construction shown in Fig. 38 without the initial bearing members;

Fig. 40 is a transverse section on the line 40—40 of Fig. 39;

Fig. 41 is a similar view with one of the locking inserts in an intermediate position;

Fig. 42 is a detail top plan view of one of the locking inserts;

Fig. 43 is a top plan view of a slightly modified form of locking insert;

Fig. 44 is a top plan view of a buckle having attached thereto two initial bearing members by another modified form of holding means;

Fig. 45 is a section on the line 45—45 of Fig. 44;

Fig. 46 is an end elevation with parts shown in section of the construction shown in Fig. 44;

Fig. 47 is a top plan view of the construction shown in Fig. 44 without the initial bearing member;

Fig. 48 is a detail perspective view of one of the holder members in the modified construction illustrated in Fig. 44.

While a number of embodiments of the invention are illustrated in the drawings, it will be understood that minor changes and modifications may be made in the particular constructions shown and the invention may be embodied in still other forms as will appeal to those skilled in the art and falling within the scope of the appended claims without departing from the spirit of the invention.

Referring to a detail description of the particular embodiment of the invention illustrated in Figs. 1 to 9 inclusive, the tie holder shown comprises a rigid substantially flat rectangular shaped front bar 1 having an attaching portion comprising a short straight part 2$^a$ extending rearwardly from the rear side of the front bar at one end thereof at substantially a right angle thereto and a part 2 extending reversely from the outer end of the part 2$^a$ in back of and in spaced relation with the rear face of the front bar 1, the attaching portion as shown in Fig. 3 being of less width than the width of the front bar, and the part 2$^a$ being joined to the front bar intermediate the sides thereof. To the outer end of the part 2 is pivotally connected a spring pressed clasp member 3. Secured in a recess in the rear face of the bar 1 at the outer end thereof by spot welding or by rivets 4, as shown, is a locking plate 5 constructed of spring metal and having a locking finger 6 extending outwardly therefrom. The bar 1 has perforations 7 at intervals along the same, the perforating of the bar serving to lighten the same, and the perforation opposite the spring locking finger 6 providing a space through which the locking finger may be actuated. Supported on the front bar 1 are a plurality of character bearing members each in the form of a flat elongated generally rectangular shaped sleeve or tubular base portion 8 and a character 9 on the front face thereof. In the present instance, the characters 9 are shown as initial letters. The interior of the flat sleeve or tubular base portion 8 of each of these character bearing members in cross section is rectangular shaped and of a size comparable to that of the cross sectional shape and size of the bar 1 to slidably fit on the front bar 1 so that the latter forms a firm support for the character bearing members when mounted thereon. The back wall 10 of the tubular base portion 8 of each of the character bearing members is provided with a recess 11 at each end thereof intermediate its sides adapted to receive therein an inner part of the rearwardly extending attaching portion 2 of the front bar 1 so that the character bearing members can be arranged in end to end relation on the front bar as shown in Fig. 4 of the drawings with one end of the back wall 10 of the tubular base portion 8 of the innermost character bearing member on the front bar fitting against the attaching portion 2 and with the adjacent end portion of the front wall of the tubular base overlying the front face of the adjacent end portion of the front bar 1 and with its end face extending substantially flush with the adjacent end face of the front bar, the front bar being completely concealed from view from the front of the assembled character bearings members. The back wall 10 of the tubular base portion of each of the character bearing members is provided with an aperture 12, one end wall 13 of which forms a locking shoulder or notch to cooperate with the locking finger 6 on the back of the front bar 1 to lock the character bearing members thereon as shown in Fig. 4 of the drawings. The aperture 12 in addition to forming a locking notch or shoulder to cooperate with the locking finger 6, also provides an opening through which may be inserted the point of a pencil or like implement to exert sufficient pressure on the locking finger to disengage the same from the end edge 13 of the recess 12 and release the character bearing members, permitting removal of the same for rearrangement or substitution of others.

The modified form of locking means illustrated in Fig. 10 of the drawings, is the same as that shown in Figs. 4 and 5 except that instead of the locking plate having a single locking finger to engage the outermost of the character bearing members on the supporting bar, a locking plate substantially the length of the front bar is provided, the same having a plurality of locking fingers, one for each of the character bearing members, providing for the individual locking of the same. In this view 14 designates the front bar of the tie holder having a rearwardly extending attaching portion 15 at one end thereof and 16 is a clasp member pivotally connected to the outer end of the attaching portion 15. 17 designates the spring locking plate suitably secured in a recess in the back wall of the front bar 14 and having equally spaced along the same three locking fingers 18, each adapted to cooperate with the shoulder or notch formed by the edge wall 13 of the aperture in the back wall 10 of one of the character bearing members. As shown in Fig. 10 each of the spring fingers 18 is disposed opposite one of the perforations 19 in the front bar 14.

The particular mounting hereinbefore described, is simple in construction. It provides for easily assembling the character bearing members on the holder bar and securely locking the same thereon, the character bearing members being applied simply by slipping the same onto the front bar. Provision is made for readily releasing the character bearing members so that the same may be rearranged or others substituted in case change of selection is made or error in composing the desired monogram arrangement, and when the character bearing members are assembled on the holder bar, the holder bar is completely concealed from view from the front of the assembled character bearing members, the general appearance of the display of initials being thus enhanced.

The character bearing members are preferably formed by die casting as this enables the development of designs with depth to produce third dimensional effects. However, the character bearing members may also be manufactured from sheet metal, this latter method enabling the use of flat, embossed, enameled, or perforated effects on the face thereof.

In Figs. 11 to 20 is illustrated a cuff link provided with a single character bearing member. The cuff link structure shown comprises a front retaining bar 20 having a rearwardly extending attaching portion 21 extending from one end thereof and from which extends a shank 22 having a U-shaped part 23 between the outer ends of which is pivotally connected a retaining member 24 of conventional form.

The initial mounting shown in these views is substantially the same in construction as that hereinbefore described and illustrated in Figs. 1 to 10, except that only a single character bearing member is employed. Suitably secured in a recess in the rear face of the front bar 20 is a spring locking plate 25 having a locking finger 26 projecting outwardly therefrom. 27 designates the base portion of the character bearing member and 28 an initial on the front face thereof. The base portion 27 is formed tubular to slidably fit upon the front retaining bar 20, and the back wall 29 of the tubular base portion is provided at one end with a recess 30 to receive the upper part of the rearwardly extending attaching portion 21 so that the character bearing member can be positioned on the front bar with one end of its back wall 29 fitting against the attaching portion 21, the adjacent front wall of the tubular base portion 27 extending over the adjacent end of the front bar 20, the latter, as shown in Fig. 12 of the drawings, being concealed from view from the front when the character bearing member is positioned thereon. 31 designates the aperture in the back wall 29 of the tubular base portion of the character bearing member. This recess, as in the construction hereinbefore described, provides an edge wall 32 forming a locking shoulder or notch to cooperate with the spring locking finger 26 on the back of the front bar 20.

As will be appreciated, while in the single initial cuff link just described, the back wall 29 of the base portion of the initial bearing member is shown with a recess 30 in only one end thereof, it could have a similar recess in its other end as in the initial member employed in the necktie holder illustrated in Figs. 1 to 10, the latter construction of initial bearing member being adapted to be employed interchangeably in the two devices.

In Figs. 21 to 24, is shown a two-initial cuff link. This construction comprises a front retaining bar 33 having a stud or shank 34 extending rearwardly therefrom centrally of its ends and including a U-shaped part 35 between the outer ends of which is pivotally mounted a retaining member 36. Suitably secured in a recess in the rear face of the front retaining bar 33 at either side of the stud or shank 34 are two spring locking plates 37, each of said plates having a spring finger 38 extending outwardly therefrom. Supported on the front retaining bar 33 at either side of the stud or shank 34 are character bearing members, which are of the same construction as that hereinbefore described and illustrated in Figs. 6 to 9 of the drawings. 39 designates the base portion of the character bearing member and 40 the initial on the front face thereof, the base portion being formed tubular to slidably fit on the front retaining bar 33, the character bearing members being slipped onto the front bar 33 from opposite ends thereof. The back wall 41 of the tubular base portion of each of the character bearing members is provided at each end thereof with a recess 42 to partially receive therein the upper part of the stud or shank 34 as shown in Figs. 22 and 23, when the character bearing members are positioned on the front bar 33, the adjacent ends of the base portions of the character bearing members fitting close together and extending over the central part of the front bar 33 so that the front bar is completely concealed from view from the front of the assembled character bearing members. The back wall 41 of the tubular base portion of each of the character bearing members is provided with an aperture 43, one end edge 44 of which forms a locking shoulder or notch to co-act with one of the spring locking fingers 38 as in the constructions hereinbefore described. As will be understood, as the tubular base portions 39 of the character bearing members are slipped onto the front retaining bar 33, the locking fingers 38 will engage the locking shoulders formed by the end edges 44 of the recesses 43, and the character bearing members will be securely locked on the front bar.

Referring now in detail to the particular embodiment of the invention illustrated in Figs. 25 to 30A, the adjustable tie holder illustrated comprises a supporting bar 45 having a clasp 46 on the back thereof to engage over the edge portion of the garment to attach the tie holder in position. Mounted on the supporting bar 45 at the front thereof for adjustment longitudinally are a pair of oppositely disposed inwardly directed arms 47, which are constructed of wire and are of general U-shaped form, each having one leg portion 48 thereof slidably engaging a longitudinally extending tubular box like bearing 49 on the front of the supporting bar 45, the other leg portions 50 of the arms 47 being disposed forwardly of and in spaced relation with said box like bearing 49. Each forward leg portion 50 of the arms 47 is bent to rectangular shape and terminates in a locking finger 51 extending longitudinally between the sides thereof, the free end portion of the wire of the locking finger being flattened to spatulate shape, as shown.

The rectangular shaped forward leg portions 50 are each adapted to support thereon an initial bearing character of the same construction as that previously described. In these views, 52 designates the tubular base portion of the initial members and 53 the initials thereon, the back wall 54 of the tubular base portion of each initial member having a recess 55 in each end thereof, and the back wall also being provided with an aperture 56. The rectangular shaped forward leg portions 50 of the tie embracing arms are of a size to permit the tubular base portions of the initial members to slidably fit thereon. As shown in Figs. 27 and 28, when the character bearing members are positioned on the rectangular shaped portions 50, the recess 55 in the back wall 54 of each of the initial members receives therein the outer end portion of one of the intermediate portions of the U-shaped tie holding arms 47, so that the front wall of the tubular base portion extends over the adjacent end portion of the rectangular shaped portion 50, the rectangular shaped portions 50 being completely concealed from view from the front of the initial members. As will be understood, when the tubular base portions of the initial bearing members are slipped to position on the rectangular shaped portions 50, the locking fingers 51 will engage with the locking shoulders or notches formed by end walls 57 of the apertures 56 to lock the initial members on the rectangular shaped forward leg portions 50.

In the embodiment of the invention illustrated in Figs. 31 to 37, the invention is shown applied to a flat surface product or support member of plate form. In the construction shown in these views, 58 designates a plate, which in this instance forms part of a belt buckle of the box type. The plate 58 is slotted, as shown, to provide two oppositely disposed rectangular shaped tongues 59 bent to extend outwardly therefrom and each adapted to support a character bearing member of the construction previously described herein, comprising a tubular base portion 60 with an initial letter 61 thereon. The back wall 62 of the tubular base portion of each of the character bearing members is as shown provided with a recess 63 in each end thereof. The tubular base portions 60 of the character bearing members are adapted to slidably fit on the tongues 59 and are slipped on the same as shown in Fig. 34 of the drawings. The tongues 59 with the character bearing members thereon are then bent inwardly to extend in the plane of the supporting plate 58 as illustrated in Fig. 33. A lock member 64 in the form of a thin spring strip is then inserted into the tubular base portions 60 of both of these character bearing members at the under side of the supporting tongues 59, the locking member serving to maintain the tongues 59 in alignment and the character bearing members being securely locked in assembled position. As shown in the drawings in Fig. 31, when the initial bearing members are assembled on the plate 58 the holding means for the same is entirely concealed from view from the front thereof.

The embodiment of the invention illustrated in Figs. 38 to 42 is another example of the application of the invention to a support of plate form, where it is not feasible or practical to slip the tubular base portions of the character bearing members on the holder member as in the bar form of holder. 65 designates the supporting plate, which in this instance forms part of a key chain, the same having an eye 66 at each side thereof connected with a link of the key chain 67. Two character bearing elements are mounted side by side on the supporting plate 65, the character members being of the same construction hereinbefore described, each comprising a tubular base portion 68 with an initial 69 on the front thereof, the back wall 70 of the base portion of each character bearing member having a recess 71 in each end thereof and also having an aperture 72. The character bearing members are attached to the supporting plate 65 by a pair of U-shaped clip members 73, one leg portion of each clip member comprising two parallel tongue portions 74 each having a spring locking finger 75 projecting outwardly therefrom. The locking members 73 are applied as shown in Figs. 40 and 41 with each one of their tongue portions 74 inserted into the tubular base portion 68 of one of the character bearing members from one end thereof to fit against the back wall 70 of the same with its locking finger 75 engaging an end wall 76 of the aperture 72, the intermediate portion 77 of the clip fitting against the adjacent side edges of the back wall 70 of the base portion and the supporting plate 65, and with the rear leg portion 78 of the clip fitting against the back of the supporting plate. As will be understood, the character bearing members will be securely held on the supporting plate, the latter and the clip members 73 being entirely concealed from view from the front of the character bearing members.

The modified form of attaching clip illustrated in Fig. 43 is the same as that shown in Figs. 40, 41 and 42 except that it has only a single tongue 79 to engage over the back wall 70 of the character bearing member. 80 designates the locking finger on the tongue 79.

The embodiment of the invention illustrated in Figs. 44 to 48, is still another exemplification of the attachment of character bearing members of the construction hereinbefore described, to a supporting member of plate form. The construction shown comprises a supporting plate 81 which is part of a belt buckle. Two character bearing members are shown attached to the supporting plate, each of the same having a tubular base portion 82 with an initial 83 thereon. The back wall 84 of the tubular base portion of each of the character bearing members is provided with a recess 85 in each end thereof. Disposed side by side on the upper face of the supporting plate 81 are a pair of spring plate members 86, the same being secured intermediate their ends in any suitably way, as by rivets 87 to the supporting plate and each having opposite end portions thereof bent to form outwardly projecting locking fingers 88, the distance between the locking fingers 88 of each spring plate member 86 corresponding substantially to the length of the back wall 84 of the tubular base portion 82 between the recesses 85, whereby upon insertion of the character bearing members between the pairs of locking fingers 88, the latter will be disposed in said recesses and will be placed under tension in engagement with the adjacent end portions of said back wall to hold the character bearing member seated on the supporting plate. As shown in Fig. 44 when the character bearing members are assembled on the supporting plate, the holding means therefor is entirely concealed from view from the front of the character bearing members. The character bearing members may be removed by inserting the blade of a pen knife or the like into the end of the tubular base portion just above the spring finger and pulling the initial outwardly.

It will be noted that the particular construction of character bearing member hereinbefore set forth provides for easy assembly of the same on a support member, that it can be used interchangeably in all of the embodiments of the invention hereinbefore described with support members of either bar or plate form, and in all of the embodiments, the holding means for the character bearing member or members is wholly concealed from view from the front thereof.

What I claim is:

1. A tie holder including a supporting bar having an attaching clasp portion at the rear side thereof, a pair of oppositely disposed inwardly directed tie embracing arms on the supporting bar in the front side thereof, one of said arms being of general U-shaped form constructed of wire having its forward leg portion at its free end bent to provide a substantially rectangular shaped part terminating in a locking finger extending longitudinally between the sides thereof, a substantially rectangular shaped character bearing member having a tubular base portion to fit over said rectangular shaped part of said arm and having a notch in a wall thereof cooperating with said locking finger on said arm to lock the character bearing member on said rectangular shaped part when the tubular base portion is slipped to position on the supporting bar.

2. A tie holder including a supporting bar having an attaching clasp portion at the rear side thereof, a pair of oppositely disposed inwardly directed tie embracing arms on the supporting bar in the front side thereof, one of said arms being of general U-shaped form constructed of wire having its forward leg portion at its free end bent to provide a substantially rectangular shaped part terminating in a locking finger extending longitudinally between the sides thereof, a substantially rectangular shaped character bearing member having a tubular base portion to fit over said rectangular shaped part of said arm and having a notch in a wall thereof cooperating with said locking finger on said arm to lock the character bearing member on said rectangular shaped part when said base portion is slipped to position on the supporting bar, said character bearing member having a recess in one end of its back wall to receive therein an end portion of the intermediate portion of said U-shaped tie embracing arm, whereby said character bearing member can be positioned on said rectangular shaped part with one end thereof fitting against said intermediate portion of said U-shaped tie embracing arm, and with its adjoining upper part extending over and concealing from view the adjacent end portion of the rectangular shaped part.

3. A cuff link including a front retaining bar and a shank portion extending rearwardly from the back face thereof substantially centrally of the ends thereof, a pair of substantially rectangular shaped character bearing members, each having a tubular base portion to slidably fit over said front bar, the back wall of the tubular base portion of each of the character bearing members having a recess in one end thereof to partially receive therein said shank portion, whereby the two character bearing members can be slipped onto said front bar from opposite ends thereof and positioned with their adjacent ends in abutting relation and extending over and concealing from view the central part of said front bar.

4. In a mounting of the class described, an elongated generally rectangular shaped substantially rigid support member, a substantially flat elongated generally rectangular shaped tubular character bearing member open at each end, the interior of the tubular character bearing member in cross section being rectangular shaped and of a size comparable to that of the cross sectional size of the support member so that the tubular character bearing member will slidably fit on and be supported by the support member, the back wall of the tubular character bearing member being provided with a notch therein, and a spring finger on the support member at the rear side thereof normally projecting rearwardly therefrom and movable relative thereto into engagement with said notch when the tubular character bearing member is slipped to position on the support member to lock the character bearing member thereon.

5. In a mounting of the class described, an elongated generally rectangular shaped substantially rigid support member, a substantially flat elongated generally rectangular shaped tubular character bearing member open at each end, the interior of the tubular character bearing member in cross section being rectangular shaped and of a size comparable to that of the cross sectional size of the support member so that the tubular character bearing member will slidably fit on and be supported by the support member, the back wall of the tubular character bearing member being provided with an aperture therein, and a spring finger on the support member at the rear side thereof normally projecting rearwardly therefrom and movable relative thereto into engagement with a wall of said aperture when the tubular character bearing member is slipped to position on the support member to lock the character bearing member thereon, said spring finger extending over said aperture at the inner side thereof when the same is in locking engagement with said wall of the aperture, said aperture providing for insertion of a member therein and forcing the spring finger inwardly out of engagement with said wall of the aperture.

6. In a mounting of the class described, an elongated generally rectangular shaped substantially rigid support member, an attaching portion extending from the rear side of the support member, the attaching portion being of less width than the width of the support member and being joined thereto intermediate the sides thereof, a substantially flat elongated generally rectangular shaped tubular character bearing member open at both ends, the interior of the tubular character bearing member in cross section being rectangular shaped and of a size comparable to the cross sectional size of the support member so that the tubular character bearing member will slidably fit on the support member with its interior top, bottom and side walls engaging the front, rear and side walls of the support member and the character bearing member will be firmly supported thereon, the back wall of the tubular character bearing member having a recess therein extending inwardly from one end thereof intermediate its sides to receive therein a portion of the inner end part of said attaching portion whereby the character bearing member can be positioned on the support member with the inner end wall of said recess fitting against said attaching portion and with the adjoining part of its front wall overlying and concealing from view the adjacent front face portion of the support member in front of the inner end part of the attaching portion.

7. In a mounting of the class described, an elongated generally rectangular shaped substantially rigid support member, an attaching portion extending from the rear side of the support member at one end thereof, the attaching portion being of less width than the width of the support member and being joined thereto intermediate the sides thereof, a substantially flat elongated generally rectangular shaped tubular character bearing member open at both ends, the interior of the tubular character bearing member in cross section being rectangular shaped and of a size comparable to the cross sectional size of the support member so that the tubular character bearing member will slidably fit on the support member with its interior top, bottom and side walls engaging the front, rear and side walls of the support member and the character bearing member will be firmly supported on the support member, the back wall of the tubular character bearing member having a recess therein extending inwardly from one end thereof intermediate its sides to receive therein a portion of the inner end part of said attaching portion whereby the character bearing member can be positioned on the support member with the inner end wall of said recess fitting against said attaching portion and with the adjoining part of its front wall overlying and concealing from view the adjacent front face portion of the support member in front of the inner end part of the attaching portion, and with its end face extending substantially flush with the adjacent end face of the support member.

8. In a mounting of the class described, an elongated rectangular shaped substantially rigid supporting bar, an attaching portion extending from the rear side of the supporting bar at one end thereof, the attaching portion being of less width than the width of the supporting bar and being joined thereto intermediate the sides thereof, a plurality of substantially flat elongated generally rectangular shaped tubular character bearing members each open at both ends, the interior of each of the tubular character bearing members in cross section being rectangular shaped and of a size comparable to the cross sectional size of the supporting bar so that the tubular character bearing members each will slidably fit on the supporting bar and be firmly supported thereon, the combined length of the character bearing members being substantially equal to the length of the supporting bar, the back wall of each of the tubular character bearing members having a recess therein extending inwardly from one end thereof intermediate its sides to receive therein a portion of the inner end part of said attaching portion whereby the character bearing members can be interchangeably positioned with reference to each other on the supporting bar in end to end relationship, with the inner end wall of the recess in one end portion of the back wall of one of the character bearing members fitting against said attaching portion and with the adjoining part of its front wall overlying the adjacent front face portion of the supporting bar in front of the inner end part of the attaching portion, and with its end face extending substantially flush with the adjacent end face of the supporting bar, the character bearing members jointly completely overlying the front face of the supporting bar and concealing the same from view from the front side of the character bearing members.

EDWIN S. MIX.

REFERENCES CITED

The following references are of record in the file of this patent:

UNITED STATES PATENTS

| Number | Name | Date |
| --- | --- | --- |
| 466,344 | Groenman | Jan. 5, 1892 |
| 1,184,124 | Pfiffner | May 23, 1916 |
| 1,224,965 | Schwartzman | May 8, 1917 |
| 1,412,938 | Halket | Apr. 18, 1922 |
| 1,738,865 | Buchsbaum | Dec. 10, 1929 |
| 2,087,032 | Henrikson | July 13, 1937 |
| 2,175,305 | Paris | Oct. 10, 1939 |
| 2,192,883 | Forstner | Mar. 12, 1940 |
| 2,221,926 | Quant | Nov. 19, 1940 |